(12) United States Patent
Bristow et al.

(10) Patent No.: US 6,524,420 B1
(45) Date of Patent: Feb. 25, 2003

(54) COMPOSITE AND PROCESS FOR MAKING

(75) Inventors: Paul Anthony Bristow, Dalton, MA (US); Thomas Paul Dunton, New Lebanon, NY (US); Glen R. Tryson, Malden Bridge, NY (US)

(73) Assignee: General Electric, Pittsfield, MA (US)

( * ) Notice: Subject to any disclaimer, the term of this patent is extended or adjusted under 35 U.S.C. 154(b) by 0 days.

(21) Appl. No.: 09/579,812

(22) Filed: May 26, 2000

Related U.S. Application Data

(60) Provisional application No. 60/136,591, filed on May 28, 1999.

(51) Int. Cl.$^7$ ............... B29B 7/00; B29C 47/00; B29C 47/04; B32B 33/00; B32B 27/08
(52) U.S. Cl. ............ 156/242; 156/244.11; 156/244.27; 264/173.11; 264/173.16; 427/412.1; 428/412; 428/474.4; 428/476.1
(58) Field of Search ................. 156/230, 231, 156/238, 244.11, 244.27, 246, 247, 249, 242; 264/173.16, 173.11; 428/330, 412, 474.4, 476.1; 427/412.1

(56) References Cited

U.S. PATENT DOCUMENTS

| | | |
|---|---|---|
| 2,999,835 A | 9/1961 | Goldberg |
| 3,038,365 A | 6/1962 | Peterson |
| 3,153,008 A | 10/1964 | Fox |
| 3,257,357 A | 6/1966 | Stoeff |
| 3,257,358 A | 6/1966 | Stoeff |
| 3,306,874 A | 2/1967 | Hay |
| 3,334,154 A | 8/1967 | Kim |
| 3,635,895 A | 1/1972 | Kramer |
| 4,001,184 A | 1/1977 | Scott |
| 4,123,436 A | 10/1978 | Holub et al. |
| 4,131,575 A | 12/1978 | Adelmann et al. |
| 4,204,047 A | 5/1980 | Margotte et al. |
| 4,647,493 A * | 3/1987 | LeGrand et al. ............ 428/215 |
| 4,737,414 A | 4/1988 | Hurt et al. |
| 5,446,767 A | 8/1995 | Nakagawa et al. |
| 5,486,407 A | 1/1996 | Noell et al. |
| 5,601,679 A | 2/1997 | Mulcahy et al. |
| 5,683,801 A * | 11/1997 | Miura ..................... 428/318.6 |
| 5,770,274 A * | 6/1998 | Christel ..................... 427/535 |
| 6,153,712 A * | 11/2000 | Yamaguchi et al. ...... 526/307.1 |

OTHER PUBLICATIONS

Plastics Mold Engineering Handbook $d^{th}$Edition, 1995, pp. 468 to 498 DuBois & Pribble.

* cited by examiner

*Primary Examiner*—J. A. Lorengo

(57) ABSTRACT

A laminate composite is formed by forming a layer of a first thermoplastic resin in contact with a second compatible thermoplastic resin where the first layer comprising an acrylonitrile-butadiene-styrene layer and said second layer comprises a thermoplastic resin selected from the group consisting of comprises polycarbonate resin, phenylene ether resins, and polyamides.

23 Claims, 1 Drawing Sheet

COMPOSITE AND PROCESS FOR MAKING

This application claims rights of priority from U.S. Provisional Patent Application Ser. No. 60/136,591, filed May 28, 1999.

FIELD OF THE INVENTION

This invention relates to a multilayer composite sheet having one layer of an acrylonitrile-butadiene-styrene or ABS type polymer and adjacent layers of thermoplastic resin.

BACKGROUND OF THE INVENTION

Multi-layer material systems which combine the positive properties of two or more different materials are known. Ideally, the materials are combined with the integrity of each material being essentially uncompromised. Although many of these multilayers can be hypothesized on the basis of laminating a material possessing certain strong properties with a material having strong properties in other areas, certain practical considerations inhibit successful implementation of this theory. The two materials are in intimate contact at their interface. The compatibility of the two resins at this interface is generally not known until actually contacted at the high temperatures necessary to obtain adherence of the two layers. Where incompatibility is significant, for example the two layers pull apart with little external stressing force, a tie layer that binds the two relatively incompatible layers is necessary. In general, polymers of significantly differing chemical structure are relatively incompatible and require a tie layer for many of the structure's applications.

It is desirable to combine certain polymers with significantly differing chemical structures adjacent to each other in a multilayer composition without the benefit of a tie layer.

U.S. Pat. 4,737,414 to Hirt et al describes a multilayer composite wherein a layer comprising an aromatic polyetherimide is adjacent to a layer comprising an aromatic polyester. A tie layer of a copolyestercarbonate is described.

SUMMARY OF THE INVENTION

A multi-layered composite includes an acrylonitrile-butadiene-styrene (ABS) layer in direct contact with an adjacent thermoplastic resin layer wherein the respective layers include less than a foaming amount of reactive metal oxides. The adjacent resin layer preferably comprises polycarbonate resin, phenylene ether resins, and polyamides.

It is highly desirable that the adjacent layers be compatible so that the layers adhere. It is desirable to avoid ingredients in one layer that might react with the ingredients in the other layer. A typical foaming reactive metal oxide is magnesium oxide. The above layers are compatible and are characterized by the absence of reactive materials such as some metal oxides such as magnesium oxide.

DESCRIPTION OF THE PREFERRED EMBODIMENTS

Figure 1:
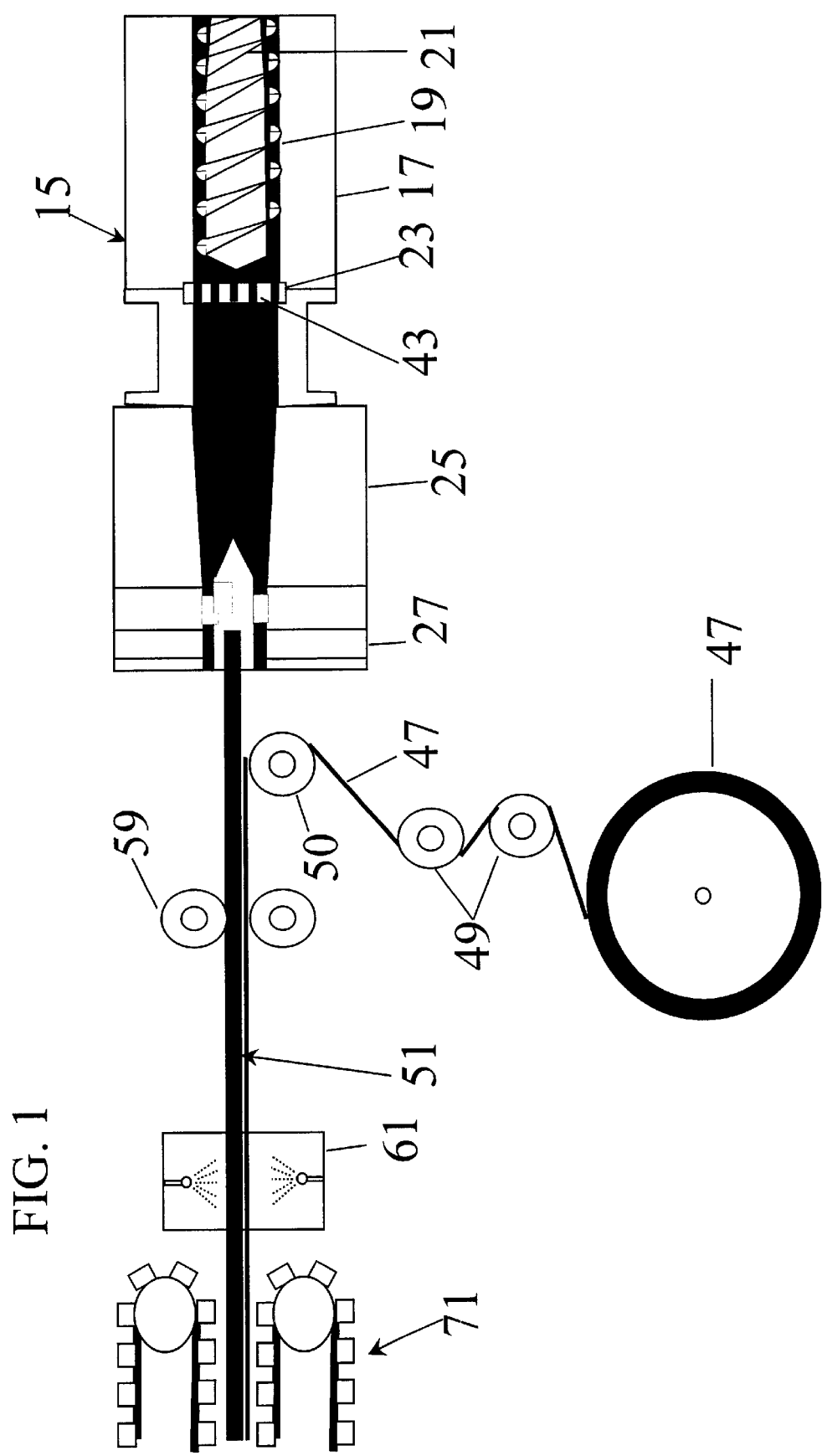
FIG. 1 is a schematic of the apparatus of the showing one type of apparatus for preparing the composite.

A preferred composition for one layer, referred to herein from time to time, as the support layer, comprises an ABS type polymer. In general, ABS type polymers contain two or more polymeric parts of different compositions which are bonded chemically. The polymer is preferably prepared by polymerizing a conjugated diene, such as butadiene or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadiene-acrylonitrile, or the like. Examples of dienes that may be used are butadiene, isoprene, 1,3-hepta-diene, methyl-1,3-pentadiene, 2,3-dimethyl-1,3-butadiene, 2-ethyl-1,3-pentadiene; 1,3- and 2,4-hexadienes, chloro and bromo substituted butadienes such as dichlorobutadiene, bromobutadiene, debromobutadiene, mixtures thereof, and the like. A preferred conjugated diene is butadiene.

One monomer or group of monomers that may be polymerized in the presence of the prepolymerized backbone are monovinylaromatic hydrocarbons. Examples of the monovinylaromatic compounds and alkyl-, cycloalkyl-, aryl-, alkaryl-, aralkyl-, alkoxy-, aryloxy-, and other substituted vinylaromatic compounds include styrene, 3-methylstyrene; 3,5-diethylstyrene, 4-n-propylstyrene, alpha -methylstyrene, alpha -methyl vinyltoluene, alpha -chlorostyrene, alpha -bromostyrene, dichlorostyrene, dibromostyrene, tetra-chlorostyrene, mixtures thereof, and the like. The preferred monovinylaromatic hydrocarbons used are styrene and/or alpha-methylstyrene.

A second group of monomers that may be polymerized in the presence of the prepolymerized backbone are acrylic monomers such as acrylonitrile, substituted acrylonitrile and/or acrylic acid esters, exemplified by acrylonitrile, and alkyl acrylates such as methyl methacrylate. Examples of such monomers include acrylonitrile, ethacrylonitrile, methacrylonitrile, alpha -chloroacrylonitrile, beta -chloroacrylonitrile, alpha -bromoacrylonitrile, and beta -bromoacrylonitrile, methyl acrylate, methyl methacrylate, ethyl acrylate, butyl acrylate, propyl acrylate, isopropyl acrylate, and mixtures thereof. The preferred acrylic monomer is acrylonitrile and the preferred acrylic acid esters are ethyl acrylate and methyl methacrylate.

In the preparation of the graft polymer, the conjugated diolefin polymer or copolymer exemplified by a 1,3-butadiene polymer or copolymer comprises about 50% by weight of the total graft polymer composition. The monomers polymerized in the presence of the backbone, exemplified by styrene and acrylonitrile, comprise from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. The monovinylaromatic hydrocarbon exemplified by styrene comprise from about 30 to about 70% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where alpha-methylstyrene (or other monomer) is substituted for the styrene in the composition used in preparing the graft polymer, a certain percentage of the composition may be an alpha-methylstyrene-acrylonitrile copolymer. Also, there are occasions where a copolymer, such as alpha-methylstyrene-acrylonitrile, is added to the graft polymer copolymer blend. When the graft as polymer-copolymer blend is referred to herein, it is meant optionally to include at least one copolymer blended with the graft polymer composition and which may contain up to 90% of free copolymer.

Optionally, the elastomeric backbone may be an acrylate rubber, such as one based on n-butyl acrylate, ethylacrylate, 2-ethylhexylacrylate, and the like. Additionally, minor amounts of a diene may be copolymerized in the acrylate rubber backbone to yield improved grafting with the matrix polymer.

The preferred ABS material for the support layer comprises Cycolac® GPX3800 and Cycolac® LSA resin available from the GE Plastics component of General Electric Company. These resins are characterized by the absence of foaming oxides.

FIG. 1 shows an extrusion molding machine or extruder at 15. The extruder 15 has a housing 17 with a central barrel shape opening 19 with a helical screw 21 mounted for rotation about an axis. At one end of the opening, a hopper (not shown) is utilized for feeding material to be extruded into the rear portion of the screw 21. Helical threads mounted on the screw 21 are positioned for moving material from the rear portion of the screw to a forward portion through the opening 19. As the material or feedstock is conveyed along the screw 21, it is heated by frictional forces caused by rotation of the screw 21. It is also contemplated that an external heating source such as an electrical resistant heater may be provided to heat the extruder 15 which in turn heats the feedstock. The housing 17 or the screw 21 are parts of the extruder which may heated.

At the forward end of the housing 17 and spaced from the forward end of the screw 21, a gate or breaker plate 23 is mounted transverse to the flow of feedstock. The gate 23, which includes a plurality of openings 43 for the passage of feedstock, acts to create a back pressure which contributes to the mixing and heating of the feedstock and also serves to filter impurities from the feedstock.

A die body 25 which is mounted on the forward end of the housing 17. The mounting is conventionally made by bolting or clamping a flange on the die body 25 to a flange on the housing 17. As illustrated in FIG. 1, the die body 25 includes a tapered central and axially aligned opening which throttles the feedstock. At the die outlet, a die plate 27, has an opening with the desired cross sectional shape of the profile to be extruded. As illustrated in FIG. 1, the extrudate is in sheet form.

It is also contemplated one or more layers may be coextruded or added at the end of the die 27. In coextrusion, additional extrudes may be provided for the additional layers. Another technique for adding a layer at the end of the die 27 is to include a capping plate which has an opening for the passage of capping layer. Typically pressures within the extruder is in excess of 2,000 lbs./sq. inch, and is preferably from 2,000 to 5,000.lbs/ sq. inch.

At the laminating station 41, the extrudate 39 in sheet form is contacted with a sheet 45. As illustrated, the sheet 45 provides support for the extrudate 39. In accordance with the present invention, a sheet 45 is provided directly in the path of the melted thermoplastic material exiting the extruder 15 so that melted flowing material is fed directly into contact with sheet 45 prior to cooling.

The carrier 47 may be in the form of a pre-wound supply and is self feeding in that no additional drive wheels are needed to collect or move the decorative sheet 45. The sheet 45 is fed around a pair of rollers 49 and then around a positioning roller 50 so as to bring the sheet 45 into contact with the extrudate 39. The momentary contact of the sheet 45 with the extrudate from the extruder 15 is sufficient unwind the sheet from the roll so it is not necessary to drive the roll.

After contacting the extrudate 39, the resulting composite is calibrated and compressed between a pair of nip rollers 59. At this point, the extrudate 39 is in molten form so that the contact made between the molten extrudate 39 and the decorative sheet 45 is sufficient to adhere the sheet to the extrudate to form a composite 51. Reference number 51 in FIG. 2 illustrates a top view of a finally formed composite or laminated sheet 51.

Next, the laminate 51 is cooled and solidified at a cooling station 61. The cooling section 61 includes a spray tank for cooling the extrusion. The additional cooling provided by the cooling section 61 removes additional heat from the extruded article. A puller is illustrated at 71 and includes a pair of opposing tractor type belt mechanisms which grip the extrusion to pull the extrusion. The puller 71 crates a stretching action as the melted article exits the extruder 17 and provides the force to pull the profile through the nip rollers 59. The lineal extrusion 44 is drawn or pulled through the stations by a puller 71. A cutter mechanism (not shown) may be used to cut the lineal extrusion into proper sheet lengths.

The resulting heat deformable laminate has improved mechanical properties such as impact resistance and melt strength which desirably exceed those of a single layer. Further, the resulting multilayed sheet may be formed into a desired shaped final article by thermoforming techniques known in the art. Thermoforming comprises simultaneously heating and forming the extruded sheet into the desired shape. Once the desired shape has been obtained, the formed article is cooled below its thermoplastic temperature and removed from the mold. In vacuum molding, the extruded sheet is placed over a concave mold and heated such as by an infra-red heater. Vacuum is applied to draw the extruded sheet into place against the mold cavity. The above may be modified by combining positive air pressure on top of the extruded sheet with vacuum from the underside to increase the molding force. In matched or compression molding, matched male and female molds or dies are employed and the extruded sheet is formed between the mechanically compressed molds. Molds are typically made from a metal having high thermal conductivity such as aluminum. Thermoforming methods and tools are described in detail in DuBois and Pribble's "Plastics Mold Engineering Handbook", Fifth Edition, 1995, pages 468 to 498.

Polycarbonate resins useful in preparing the adjacent layer are preferably aromatic polycarbonate resins. Typically these polycarbonates are prepared by reacting a dihydric phenol with a carbonate precursor, such as phosgene, a haloformate or a carbonate ester. Carbonate polymers may be typified as possessing recurring structural units of the formula:

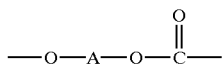

wherein A is a divalent aromatic radical of the dihydric phenol employed in the polymer producing reaction. The dihydric phenols which may be employed to provide such aromatic carbonate polymers are mononuclear or polynuclear aromatic compounds, containing as functional groups two hydroxy radicals, each of which is attached directly to a carbon atom of an aromatic nucleus. Typical dihydric phenols are: 2,2-bis(4-hydroxyphenyl) propane; hydroquinone; resorcinol; 2,2-bis(4-hydroxyphenyl) pentane; 2,4'-(dihydroxydiphenyl) methane; bis(2-hydroxyphenyl) methane; bis(4-hydroxyphenyl) methane; 1,1-bis(4-hydroxyphenyl)-3,3,5-trimethylcyclohexane; fluorenone bisphenol, 1,1-bis(4-hydroxyphenyl) ethane; 3,3-bis(4-hydroxyphenyl) pentane; 2,2-dihydroxydiphenyl; 2,6-dihydroxynaphthalene; bis(4-hydroxydiphenyl)sulfone; bis (3,5-diethyl4-hydroxyphenyl)sulfone; 2,2-bis(3,5-dibromo-4-hydroxyphenyl)propane; 2,2-bis(3,5-dimethyl-4-hydroxyphenyl)propane; 2,4'-dihydroxydiphenyl sulfone; 5'-chloro-2,4'-dihydroxydiphenyl sulfone; bis-(4-hydroxyphenyl)diphenyl sulfone; 4,4'-dihydroxydiphenyl ether; 4,4'-dihydroxy-3,3'-dichlorodiphenyl ether; 4,4-dihydroxy-2,5-dihydroxydiphenyl ether; and the like.

Other dihydric phenols which are also suitable for use in the preparation of the above polycarbonates are disclosed in U.S. Pat Nos. 2,999,835; 3,038,365; 3,334,154; and 4,131, 575.

These aromatic polycarbonates can be manufactured by known processes, such as, for example and as mentioned above, by reacting a dihydric phenol with a carbonate precursor, such as phosgene, in accordance with methods set forth in the above-cited literature and in U.S. Pat. No. 4,123,436, or by transesterification processes such as are disclosed in U.S. Pat. No. 3,153,008, as well as other processes known to those skilled in the art.

It is also possible to employ two or more different dihydric phenols or a copolymer of a dihydric phenol with a glycol or with a hydroxy- or acid-terminated polyester or with a dibasic acid in the event a carbonate copolymer or interpolymer rather than a homopolymer is desired for use in the preparation of the polycarbonate mixtures of the invention. Polyarylates and polyester-carbonate resins or their blends can also be employed. Branched polycarbonates are also useful, such as are described in U.S. Pat. No. 4,001,184. Also, there can be utilized blends of linear polycarbonate and a branched polycarbonate. Moreover, blends of any of the above materials may be employed in the practice of this invention to provide the aromatic polycarbonate.

The preferred aromatic carbonate is a homopolymer, e.g., a homopolymer derived from 2,2-bis(4-hydroxyphenyl) propane (bisphenol-A) and phosgene, commercially available under the trade designation LEXAN Registered TM from General Electric Company.

The instant polycarbonates are preferably high molecular weight aromatic carbonate polymers having an intrinsic viscosity, as determined in chloroform at 25° C. of from about 0.3 to about 1.5 dl/ gm, preferably from about 0.45 to about 1.0 dl/gm. These polycarbonates may be branched or unbranched and generally will have a weight average molecular weight of from about 10,000 to about 200,000, preferably from about 20,000 to about 100,000 as measured by gel permeation chromatography.

The branched polycarbonates may be prepared by adding a branching agent during polymerization. These branching agents are well known and may comprise polyfunctional organic compounds containing at least three functional groups which may be hydroxyl, carboxyl, carboxylic anhydride, haloformyl and mixtures thereof. Specific examples include trimellitic acid, trimellitic anhydride, trimellitic trichloride, tris-p-hydroxy phenyl ethane, isatin-bis-phenol,tris-phenol TC (1,3,5-tris((p-hydroxyphenyl) isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid and benzophenone tetracarboxylic acid. The branching agent may be added at a level of about 0.05-2.0 weight percent. Branching agents and procedures for making branched polycarbonates are described in U.S. Pat. Nos. 3,635,895; 4,001,184; and 4,204,047 which are incorporated by reference. All types of polycarbonate end groups are contemplated as being within the scope of the present invention.

The adjacent layer may be a polyphenylene ether resin. Typical polyphenylene ether resin is a poly(2,6-dimethyl-1, 4-phenylene)ether resin having an intrinsic viscosity of from about 0.3 dl/g to about 0.60 dl/g in chloroform. The polyphenylene ether resins useful herein are well known in the art and may be prepared from a number of catalytic and non-catalytic processes from corresponding phenols or reactive derivates thereof. Examples of polyphenylene ethers and methods for their production are disclosed in U.S. Pat. Nos. 3,306,874; 3,306,875; 3,257,357 and 3,257,358, all incorporated herein by reference.

The adjacent layer may be a polyamide resin. Typical polyamides suitable for the present invention may be obtained by polymerizing a monoamino monocarboxylic acid or a lactam thereof having at least 2 carbon atoms between the amino and carboxylic acid group; or by polymerizing substantially equimolar proportions of a diamine which contains at least 2 carbon atoms between the amino groups and a dicarboxylic acid; or by polymerizing a monoaminocarboxylic acid or a lactam thereof as defined above together with substantially equimolecular proportions of a diamine and a dicarboxylic acid. The dicarboxylic acid may be used in the form of a functional derivative thereof, for example an ester.

Preferred thickness for the ABS layer is from about 0.002 inch (2 mils) to about 0.250 inch (250 mils) with preferred thicknesses of the adjacent thermoplastic layer being from about 0.050 inch (50 mils) to about 0.500 inch (500 mils).

Preferred multilayered structures include the following as set forth below:

A two layered structure having a total thickness of 200 to 400 mils, preferably 300 mils, with the adjacent layer being 15 to 40 percent of the total thickness.

A two layered structure having a total thickness of 90 to 125 mils, with the adjacent layer being 15 to 30 percent of the total thickness.

A two layered structure having a total thickness of 90 to 125 mils, with the outer adjacent layer being 15 to 30 percent of the total thickness.

The desired thickness of the extruded sheet is somewhat dependent upon the use of the sheet.

It is highly desirable that the layers be compatible so that the layers adhere. It is desirable to avoid ingredients in one layer that might react with the ingredients in the other layer. The above layers are compatible and are characterized by the absence of reactive materials such as some metal oxides such as magnesium oxide.

To achieve sound damping, it is contemplated that a foam layer may be adjacent the support or inner layer. Typically, the foam layer has a 10 to 50% density reduction for lower cost, weight reduction and sound damping. The foam may be foamed in place. See U.S. 5,486,407 to Noell et. al. It is also contemplated that the inner support layer may be adhered to a cellulosic based material such as a particleboard, fiberboard, chipboard or plywood. It is also contemplated that abrasive resistant coatings such as described in U.S. Pat. No. 5,446,767 may be utilized in conjunction with the present invention.

Thermoforming methods may be utilized as set forth in U.S. Pat. No. 5,601,679 to Mulcahy et al. A co-extruded sheet may be vacuum formed. Typically, the vacuum former and surrounding metal framework are preheated to minimize chill of the sheet. The sheet is placed on a vacuum box and mounted on the bottom side of the former or platten. Clamp frames are activated for mechanically holding the sheet in place. A suitable heat shield, such a aluminum foil, may be utilized for avoiding heating the surface at selected locations such as other than a sink portion. The sheet is then exposed to the thermo-forming ovens. Top and bottom heaters may be used. During heating, the sheet begins to sag. Once the sheet reaches its proper forming temperature, the assembly is shuttled to a vacuum forming box where sink is vacuum formed in a box. The box has a plurality openings in a mold form for drawing the sheet into mold during the forming operation. After cooling, the resulting thermoformed sheet is removed.

What is claimed is:

1. A process for forming a laminate composite by forming a first layer comprising a first thermoplastic resin in contact with a second layer comprising a second compatible thermoplastic resin, said first resin comprising acrylonitrile-butadiene-styrene and said second resin comprising polyphenylene ether; wherein reactive metal oxide is absent from said first layer and from said second layer.

2. A process for forming a laminate composite according to claim 1, wherein said reactive metal oxide is magnesium oxide.

3. A process for forming a laminate composite according to claim 1 wherein said first layer is in the form of a sheet, said sheet being stored on a carrier and moved from said carrier into contact with said second resin wherein said second resin is being extruded to form said second layer.

4. A process for forming a laminate composite according to claim 3 wherein said first and second resin layers comprise a heat deformable laminate having mechanical properties which exceed these properties as possessed by one of said layers.

5. A process for forming a laminate composite according to claim 4 wherein said first and second layers together have a total thickness of 90 to 125 mils, and wherein said second layer comprises about 15 to 30 percent of the total thickness.

6. A process for forming a laminate according to claim 4, wherein the improved mechanical properties are selected from the group consisting of impact resistance and melt strength.

7. A process for forming a laminate composite according to claim 1, wherein said second layer is in the form of a sheet, said sheet being stored on a carrier and moved form said carrier into contact with said first resin wherein said first resin is being extruded to form said first layer.

8. A process for forming a laminate composite according to claim 1, wherein said first and second layers are coextruded.

9. A process for forming a laminate composite according to claim 4, wherein said first layer has a thickness of about 2 mils to about 250 mils.

10. A process for forming a laminate composite according to claim 4, wherein said second layer has a thickness of about 50 mils to about 500 mils.

11. A process for forming a laminate composite according to claim 4, wherein said first and second layers together have a total thickness of 200 to 400 mils, and wherein said second layer comprises 15 to 40 percent of the total thickness.

12. A process for forming a laminate composite according to claim 1, wherein said first layer further comprises an adjacent foam layer.

13. A process for forming a laminate composite by forming a first layer comprising a first thermoplastic resin in contact with a second layer comprising a second compatible thermoplastic resin, said first resin comprising acrylonitrile-butadiene-styrene and said second resin comprising a thermoplastic resin selected from the group consisting of polycarbonate, polyphenylene ether and polyamide, wherein reactive metal oxide is absent from said first resin and from said second resin.

14. A process for forming a laminate composite according to claim 13, wherein said reactive metal oxide is magnesium oxide.

15. A process for forming a laminate composite according to claim 13, wherein said first and second layers are coextruded.

16. A process for forming a laminate composite according to claim 13, wherein said first layer further comprises an adjacent foam layer.

17. A process for forming a laminate composite according to claim 13, wherein said first layer is in the form of a sheet, said sheet being stored on a carrier and moved from said carrier into contact with said second resin wherein said second resin is being extruded to form said second layer.

18. A process for forming a laminate composite according to claim 13, wherein said second layer is in the form of a sheet, said sheet being stored on a carrier and moved from said carrier into contact with said first resin wherein said first resin is being extruded to form said first layer.

19. process for forming a laminate composite according to claim 17, wherein said first and second resin layers comprise a beat deformable laminate having mechanical properties which exceed these properties as possessed by one of said layers.

20. A process for forming a laminate according to claim 19, wherein the improved mechanical properties are selected from the group consisting of impact resistance and melt strength.

21. A process for forming a laminate composite according to claim 17, wherein said first and second layers together have a total thickness of 90 to 125 mils, and wherein said second layer comprises about 15 to 30 percent of the total thickness.

22. A process for forming a laminate composite according to claim 17, wherein said first layer has a thickness of about 2 mils to about 250 mils and said second layer has a thickness of about 50 mils to about 500 mils.

23. A process for forming a laminate composite according to claim 17 wherein said first and second layers together have a total thickness of 200 to 400 mils, and wherein said second layer comprises 15 to 40 percent of the total thickness.

* * * * *